INVENTORS.
FRANZ SCHLEGEL
HANS GRUMPELT

BY Row and Berman

AGENTS

March 3, 1970  F. SCHLEGEL ET AL  3,498,713
OPTICAL SYSTEM FOR A REPRODUCTION CAMERA
Filed June 21, 1967  2 Sheets-Sheet 2

INVENTORS.
FRANZ SCHLEGEL
HANS GRUMPELT
BY Low and Berman
AGENTS

United States Patent Office 3,498,713
Patented Mar. 3, 1970

3,498,713
OPTICAL SYSTEM FOR A REPRODUCTION CAMERA
Franz Schlegel and Hans Grumpelt, Munich, Germany, assignors to Optische Werke G. Rodenstock, Munich, Germany
Filed June 21, 1967, Ser. No. 647,725
Claims priority, application Germany, Aug. 9, 1966, O 11,871
Int. Cl. G03b 27/70
U.S. Cl. 355—66       8 Claims

ABSTRACT OF THE DISCLOSURE

A roof-angle or Amici prism is inserted between the front and rear elements of the objective in a reproduction camera, the optical axes of the two elements intersecting each other at right angles at the roof-angle. If the two lens elements are symmetrical relative to a stop, the prism is interposed between the stop and one lens element, and a glass body having plane entrant and exit surfaces is inserted between the stop and the other lens element, the length of the optical path in the prism and the transparent glass body being of equal lengths.

BACKGROUND OF THE INVENTION

This invention relates to cameras, and particularly to cameras employed for reproducing paintings and the like in their original dimensions.

Because of the size of the objects usually to be reproduced, and the requirement for faithful rendition of even minute detail, the cameras employed are bulky. It is convenient to support the object on a horizontal surface, but the height of most photographic laboratories is not sufficient to accommodate a suitable camera whose optical axis is vertical.

It has been proposed heretofore to arrange a plane mirror closely adjacent the objective of the camera so that the image of the object is projected horizontally on a vertical recording medium, such as a photographic plate or film. Plane mirrors, however, invert or revert a reflected image.

Roof-angle mirrors, that is, mirrors whose reflecting surfaces are arranged at right angles to each other and define a line of intersection, permit the axis of a light beam to be deflected 90° in a plane through this line of intersection without changing the relative position of the portions of an image projected by the beam. Such a mirror, commonly employed in the form of an Amici prism or roof-angle prism, when employed instead of a plane mirror in the afore-described arrangement, is large and correspondingly heavy. It is very costly to produce an Amici prism of the necessary size to the standards of precision which are called for in reproduction techniques, and the supporting structure required to hold the heavy prism in a fixed relationship to the other elements of the optical system must be of a strength and rigidity not normally called for in photographic equipment.

It is the primary object of this invention to make the known advantages of a roof-angle mirror, and particularly of a roof-angle prism, available in a reproduction camera without unduly increasing the cost and weight of the apparatus.

SUMMARY OF THE INVENTION

According to a basic feature of the invention, a roof-angle mirror, and particularly an Amici prism, is arranged in such a manner that the optical axes of the front and rear elements of the camera objective intersect each other in the roof angle, that is, the line of intersection defined by the two reflecting surfaces of the mirror or prism. More specifically, these optical axes extend at right angles to each other and are located in a common plane with the line of intersection of the reflecting mirror surfaces in the normal operating condition of the camera.

While it is normally desirable in reproduction work to avoid inversion or reversion of the image, such an image modification is necessary in certain reproduction techniques. We therefore prefer to mount the Amici prism in the housing of our camera on a carrier together with a plane mirror. The carrier is movable on the housing transversely of the aforementioned plane and permits the Amici prism and the plane mirror alternatingly to be positioned at the point at which the optical axes of the lens elements intersect each other. The plane mirror preferably is formed by a second surface of a right-angle prism.

If the elements of the camera objective are symmetrical relative to a stop, we prefer to interpose the Amici prism between the stop and one lens element whereas a transparent member having plane entrant and exit faces is interposed between the stop and the other lens element for maintaining the symmetry of the optical system. If the Amici prism and the transparent member are made of the same material, they are dimensioned in such a manner that the optical paths through the prism and through the transparent member are of equal length.

The transparent member may also incorporate a beam splitter, such as a pellicle mirror. If the pellicle is colored, it provides a filter for selectively absorbing radiation of a wavelength that may be selected at will.

Other objects, additional features and many of the attendant advantages of this invention will readily be appreciated as the same becomes better understood by reference to the following detailed description of preferred embodiments when considered in connection with the accompanying drawing.

DESCRIPTION OF THE PREFERRED EMBODIMENTS

Figure 1:
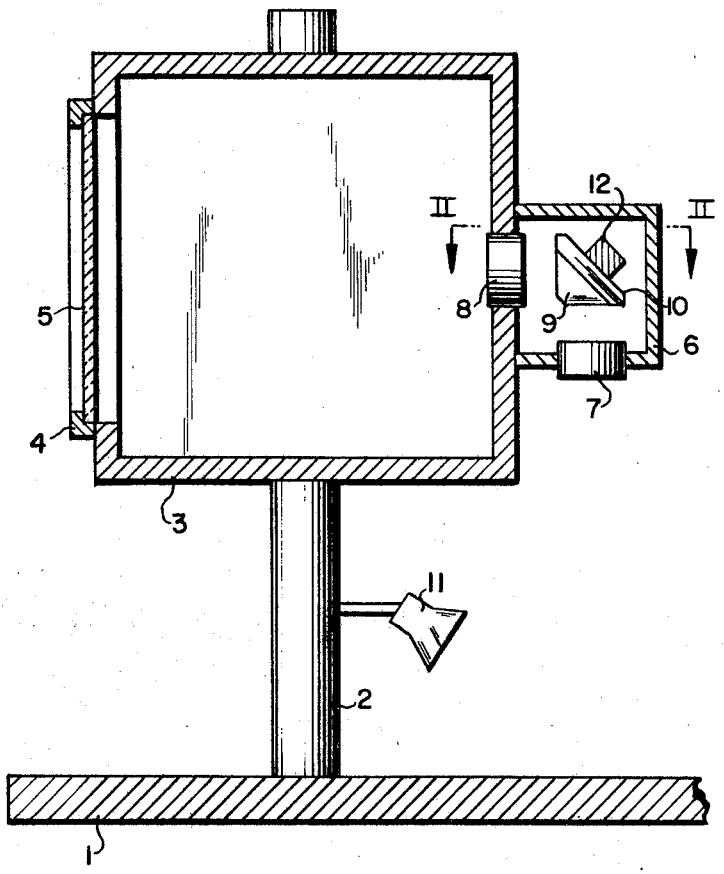
FIG. 1 shows a reproduction camera of the invention in side-elevational section.

Referring now to the drawing in detail, and initially to FIG. 1, there is shown a reproduction camera having a horizontal board 1 which holds the object to be photographed in the preferred horizontal position during use of the camera. An upright column 2 on the board 1 supports the camera housing 3. A frame 4 about an opening in the vertical rear wall of the housing accommodates a ground glass screen 5 in the illustrated condition of the camera, and is capable of holding a plate holder and an image recording medium arranged therein in a fixed position.

The optical system of the camera is mainly arranged in a compartment 6 of the housing opposite the frame 4. The system mainly consists of a front lens element 7 whose axis is vertical, a rear lens element 8 whose optical axis is horizontal, and a roof-angle or Amici prism 9 arranged in the casing in such a manner that its roof angle 10 extends in a common vertical plane with the axes of the lens elements 7, 8 which intersect each other in the roof-angle.

The lighting system of the camera is represented by a lamp 11 mounted on the column 2, and additional lighting may be provided in a conventional manner so that a beam of light passing through the optical system and deflected 90° by the prism 9 produces an image of an object arranged on the board 1 in the plane of the frame 4. The spatial relationship of the elements in the original object is maintained in the image.

Figure 2:
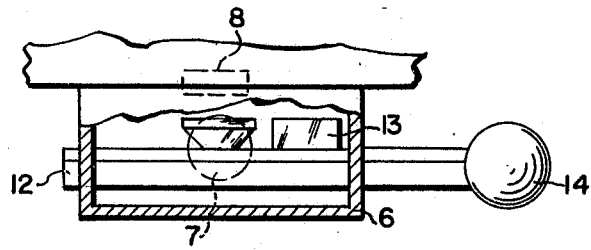
FIG. 2 shows the apparatus of FIG. 1 in fragmentary plan view, and partly in section on the line II—II.

As is better seen in FIG. 2, the Amici prism 9 is cemented to a carrier bar 12 of rectangular cross section which is elongated at right angles to the optical axes of the elements 7, 8 and is longitudinally slidable in conforming openings of the compartment 6. A right angle prism 13 is mounted on the bar 12 in such a manner that the prism 13 may be substituted for the prism 9 in the optical path of the camera by longitudinally shifting the bar 12 by means of a handle 14. The image produced when the axes of the lens elements 7, 8 meet in the reflecting second surface of the prism 13 is reversed or inversed depending on the position of the object on the board 1 while the object is being photographed.

Figure 3:
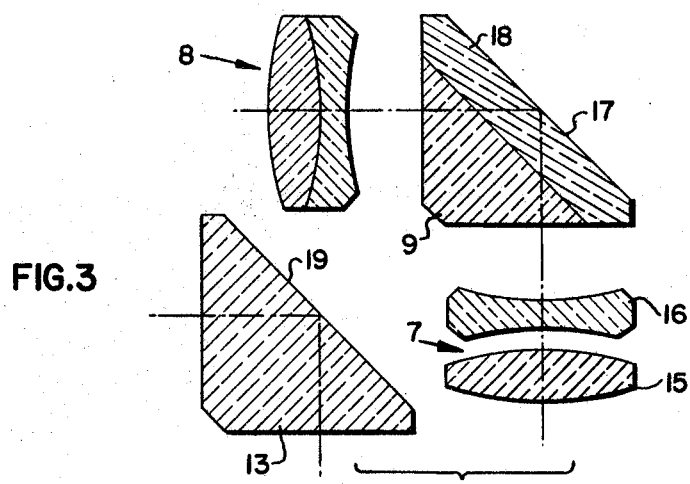
FIG. 3 illustrates the optical system of the same apparatus in a view corresponding to that of FIG. 1, but on a larger scale.

The front element 7, shown in more detail in FIG. 3, is an air-spaced doublet having a positive member 15 and a negative member 16. The rear element 8 is a cemented doublet. The lens system is conventional in itself, and does not require further discussion. FIG. 3 also shows how the optical axes of the elements 7, 8 intersect each other at the roof angle 17 between the reflecting second surfaces 18 of the Amici prism in the normal position of the latter as indicated by broken lines, and the reflection of the same axes from the silvered second surface 19 of the right-angle prism 13 in the other position of the carrier bar 12 is also indicated.

The prism 9 is located in the optical path of the projector at a point where the cross section of the beam is at or near its minimum cross section. The prism, which is capable of reflecting intensive light practically without loss, may therefore be made very small and light.

While plane mirrors may replace the reflecting second surfaces of the illustrated prisms 9, 13, the use of prisms is preferred not only because of the fixed relationship of their surfaces to each other, but also because the higher index of refraction of the transparent medium of the prism, normally glass, permits the length of the optical path to be reduced as compared to a path entirely in air.

It is usually preferred to employ symmetrical objectives in cameras of the type described because the symmetrical arrangement facilitates the correction of coma, chromatic aberration, and distortion. A stop is conventionally located in the plane of symmetry transverse of the optical axis, and thus makes it necessary to arrange an Amici prism in a symmetrical objective between the stop and one of the lens elements.

Figure 4:
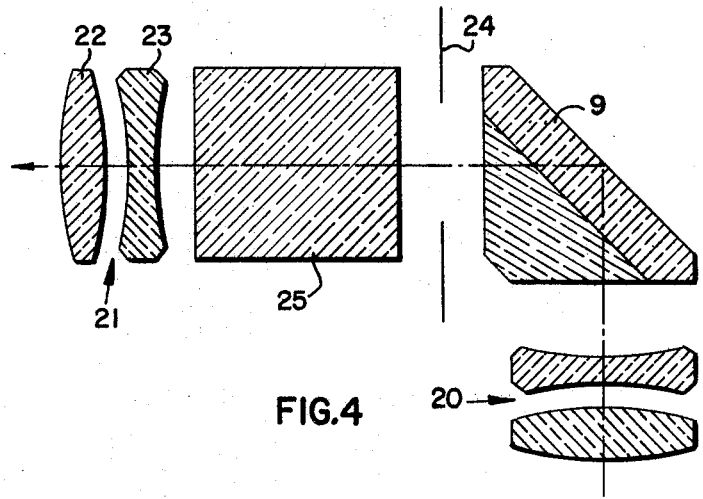
FIG. 4 shows a modified optical system in the manner of FIG. 3.

FIG. 4 shows a modification of the apparatus of FIGS. 1 to 3 in which the front lens element 20 and the rear lens element 21 consist of identical air-spaced pairs of glass members, a positive member 22 and a negative member 23. The Amici prism 9 is arranged between the front lens element 20 and the stop 24 of the optical system.

The symmetry of the optical system is maintained by a thick glass member 25 having plane entrant and exit faces and interposed between the stop 24 and the rear lens element 21. The glass member 25 consists of the same glass of which the prism 9 is made. Its length between the entrant and exit faces is practically equal to the path of light through the prism 9, as measured along the optical axes. The lens system shown in FIG. 4 can be corrected for aberrations almost as readily as a corresponding coaxial system in which the prism 9 and the glass member 25 are replaced by air. The modified corrections for spherical aberration and astigmatism necessary because of the substitution of glass for air in the optical system illustrated in FIG. 4 will be obvious to those skilled in the art.

Figure 5:
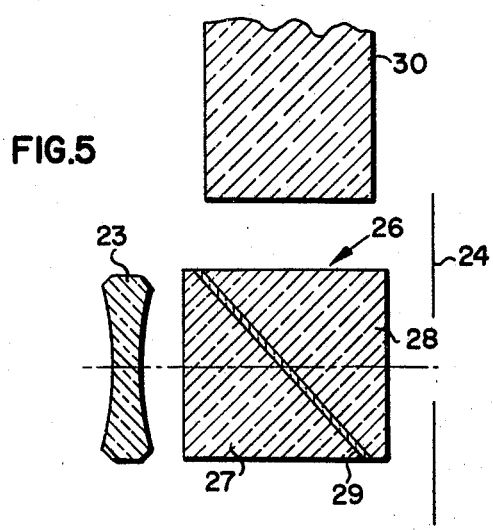
FIG. 5 illustrates a modified detail of yet another optical system identical with that of FIG. 4 as far as not shown in the drawing.

The optical system shown in FIG. 4 is readily further modified if so desired, and FIG. 5 shows but one such modification. The thick glass member 26 consists of two right angle prisms 27, 28 whose hypotenuse surfaces are separated by a pellicle membrane 29 of colored material. The membrane constitutes a beam splitter which reflects a portion of the beam from the principal optical system of the camera into an ocular 30. A photoelectric cell (not shown) may be arranged in the focal plane of the ocular for measuring exposure time. The membrane 29 also operates as a filter which absorbs light of a limited range of wavelengths. Several glass members 26 may be mounted on a common carrier bar in the manner shown in FIGS. 1 and 2, and provided with pellicle membranes of different colors for color photography in a known manner.

While the invention has been described with reference to specific embodiments, it is to be understood that it is not limited thereto.

What is claimed is:
1. A reproduction camera comprising, in combination:
 (a) a housing;
 (b) supporting means for supporting an image recording medium on said housing in a fixed position;
 (c) holding means for holding an object to be reproduced in a position spaced from said fixed position;
 (d) a carrier mounted on said housing for movement in a predetermined direction between a first position and a second position; and
 (e) an optical system on said housing for projecting an image of said object on said medium, said system including
  (1) lens means having a front element and a rear element air-spaced from said front element, said elements having respective optical axes angularly offset from each other and transverse of said predetermined direction; and
  (2) first and second mirror means secured on said carrier for movement therewith,
   (i) said first mirror means having two reflecting surfaces at right angles to each other, said surfaces defining a line of intersection, said optical axes intersecting each other in said line in said first position of said carrier, the line being transverse of said predetermined direction,
   (ii) said second mirror means having a reflecting surface, said axes intersecting each other in the reflecting surface of said second mirror means in said second position of said carrier,
   (iii) said mirror means angularly reflecting a beam of light from said object through said lens means to said medium in said first and second positions of said carrier respectively.
2. In a camera as set forth in claim 1, said axes and said line extending in a common plane, and said axes intersecting each other at right angles.
3. In a camera as set forth in claim 1, said mirror means including a roof-angle prism.
4. In a camera as set forth in claim 1, said mirror means being prisms of transparent material, said reflecting surfaces being plane second surfaces of said prisms.
5. A reproduction camera comprising, in combination:
 (a) a housing;
 (b) supporting means for supporting an image recording medium on said housing in a fixed position;
 (c) holding means for holding an object to be reproduced in a position spaced from said fixed position; and

(d) an optical system on said housing for projecting an image of said object on said medium, said system including
  (1) lens means having a front element and a rear element air-spaced from said front element, said elements having respective optical axes angularly offset from each other,
  (2) mirror means arranged for angularly reflecting a beam of light entering said optical system through one of said elements to said medium through the other element,
    (i) said mirror means having two reflecting surfaces at right angles to each other, said surfaces defining a line of intersection, said axes intersecting each other in said line,
  (3) a stop transverse of the optical axis of one of said elements and defining an air gap with said mirror means, and
  (4) a transparent solid member interposed between said stop and said one element, said transparent member having plane entrant and exit faces, the optical axis of said element passing through said transparent member and said stop.

6. In a camera as set forth in claim 5, said elements being substantially identical and symmetrical relative to said stop, said mirror means being constituted by a roof-angle prism, said prism and said transparent member being of the same material, and the portion of the optical axis of said one element passing through said transparent member having a length substantially equal to the combined length of the portions of said axes passing through said roof-angle prism.

7. In a camera as set forth in claim 5, said transparent member including beam splitting means for diverting a portion of said beam from said axis of said one member.

8. In a camera as set forth in claim 5, filter means in said optical system for selectively absorbing radiation of a predetermined limited range of wavelengths from said beam.

References Cited

UNITED STATES PATENTS

| | | | |
|---|---|---|---|
| 2,744,443 | 5/1956 | Higonnet et al. | 355—43 |
| 2,940,358 | 6/1960 | Rosenthal | 355—70 X |
| 3,101,024 | 8/1963 | Huebner | 355—60 |
| 3,282,152 | 11/1966 | Myer. | |

NORTON ANSHER, Primary Examiner

R. A. WINTERCORN, Assistant Examiner

U.S. Cl. X.R.

353—44, 81